United States Patent
Canavor et al.

(10) Patent No.: US 9,674,154 B1
(45) Date of Patent: Jun. 6, 2017

(54) PROTECTING CUSTOMERS FROM SURVEILLANCE

(71) Applicant: Amazon Technologies, Inc., Seattle, WA (US)

(72) Inventors: Darren Ernest Canavor, Redmond, WA (US); William Alexander Strand, Sammamish, WA (US)

(73) Assignee: Amazon Technologies, Inc., Seattle, WA (US)

( * ) Notice: Subject to any disclaimer, the term of this patent is extended or adjusted under 35 U.S.C. 154(b) by 73 days.

(21) Appl. No.: 14/860,435

(22) Filed: Sep. 21, 2015

(51) Int. Cl.
*H04W 12/02* (2009.01)
*H04L 29/06* (2006.01)
*H04W 8/20* (2009.01)
*H04W 4/02* (2009.01)
*H04W 4/20* (2009.01)
*H04L 29/12* (2006.01)
*G06Q 30/02* (2012.01)
*G06Q 30/06* (2012.01)
*G06F 21/62* (2013.01)
*G06N 99/00* (2010.01)
*G06F 19/10* (2011.01)

(52) U.S. Cl.
CPC ...... *H04L 63/0407* (2013.01); *G06F 21/6254* (2013.01); *G06N 99/005* (2013.01); *G06Q 30/0255* (2013.01); *G06Q 30/0259* (2013.01); *G06Q 30/0261* (2013.01); *G06Q 30/0267* (2013.01); *G06Q 30/0269* (2013.01); *G06Q 30/0601* (2013.01); *H04L 61/6022* (2013.01); *H04W 4/02* (2013.01); *H04W 4/206* (2013.01); *H04W 8/20* (2013.01); *H04W 12/02* (2013.01)

(58) Field of Classification Search
None
See application file for complete search history.

(56) References Cited

U.S. PATENT DOCUMENTS

| | | | |
|---|---|---|---|
| 2009/0298483 A1* | 12/2009 | Bratu | G06Q 30/02 455/414.2 |
| 2012/0166252 A1* | 6/2012 | Walker | G06Q 30/0203 705/7.32 |
| 2015/0081417 A1* | 3/2015 | Golden | G06Q 30/0269 705/14.41 |
| 2015/0142552 A1* | 5/2015 | Schmehl | G06Q 30/0269 705/14.41 |

(Continued)

*Primary Examiner* — Venkat Perungavoor
(74) *Attorney, Agent, or Firm* — Kilpatrick Townsend & Stockton LLP

(57) ABSTRACT

Techniques for providing an information masking service may be provided. For example, an association between masking information and one or more masking profiles may be maintained where each masking profile indicates usage behavior of a user at a particular location. In embodiments, a location of a user device may be determined based at least in part on location information received from a user device. A particular masking profile of the one or more masking profiles may be selected based at least in part on the determined location. The masking information that corresponds to the particular masking profile may be provided to the user device where the masking information is configured to be utilized by the user device when communicating with a network of the determined location rather than the default identification information of the user device.

18 Claims, 9 Drawing Sheets

(56) References Cited

U.S. PATENT DOCUMENTS

2015/0235161 A1* 8/2015 Azar .............. G06Q 10/063114
                                                    705/7.15
2015/0235275 A1* 8/2015 Shah .................. G06Q 30/0269
                                                    705/14.66

* cited by examiner

User Profile Examples

Soccer Mom

Web History:
Entertainment.com
news.com    206
grocerystore.com

Shopping History:
Diapers   212
Bread
Peanut Butter

200

Sports Fan

Web History:
Allsports.com
football.com   208
Local Sports.com

Shopping History:
Water Bottles
Beer   214
Chips

202

Video Game Player

Web History:
E-sports.com   210
streaminggaming.com
gamenews.com

Shopping History:
Video Games
Game accessories
Soda   216

PROTECTING CUSTOMERS FROM SURVEILLANCE

BACKGROUND

In a face-to-face commerce environment, a consumer can visit a vendor to purchase an item. The vendor can offer or make accessible a wireless network or other suitable network that allows visiting consumers to utilize their personal computing devices while shopping or browsing items. However, certain vendors may attempt to capture information about the consumer and associate their behavior with an identifier for their personal computing device, such as a media access control (MAC) address associated with the personal computing device. Consumers may unwittingly be providing information that they deem private to retailers and vendors as they casually browse and purchase items from said retailers, information that they would rather not share.

BRIEF DESCRIPTION OF THE DRAWINGS

Various embodiments in accordance with the present disclosure will be described with reference to the drawings, in which:

FIG. 2 illustrates several examples of masking profile examples that may be maintained by an information masking service, according to embodiments;

DETAILED DESCRIPTION

Figure 1:
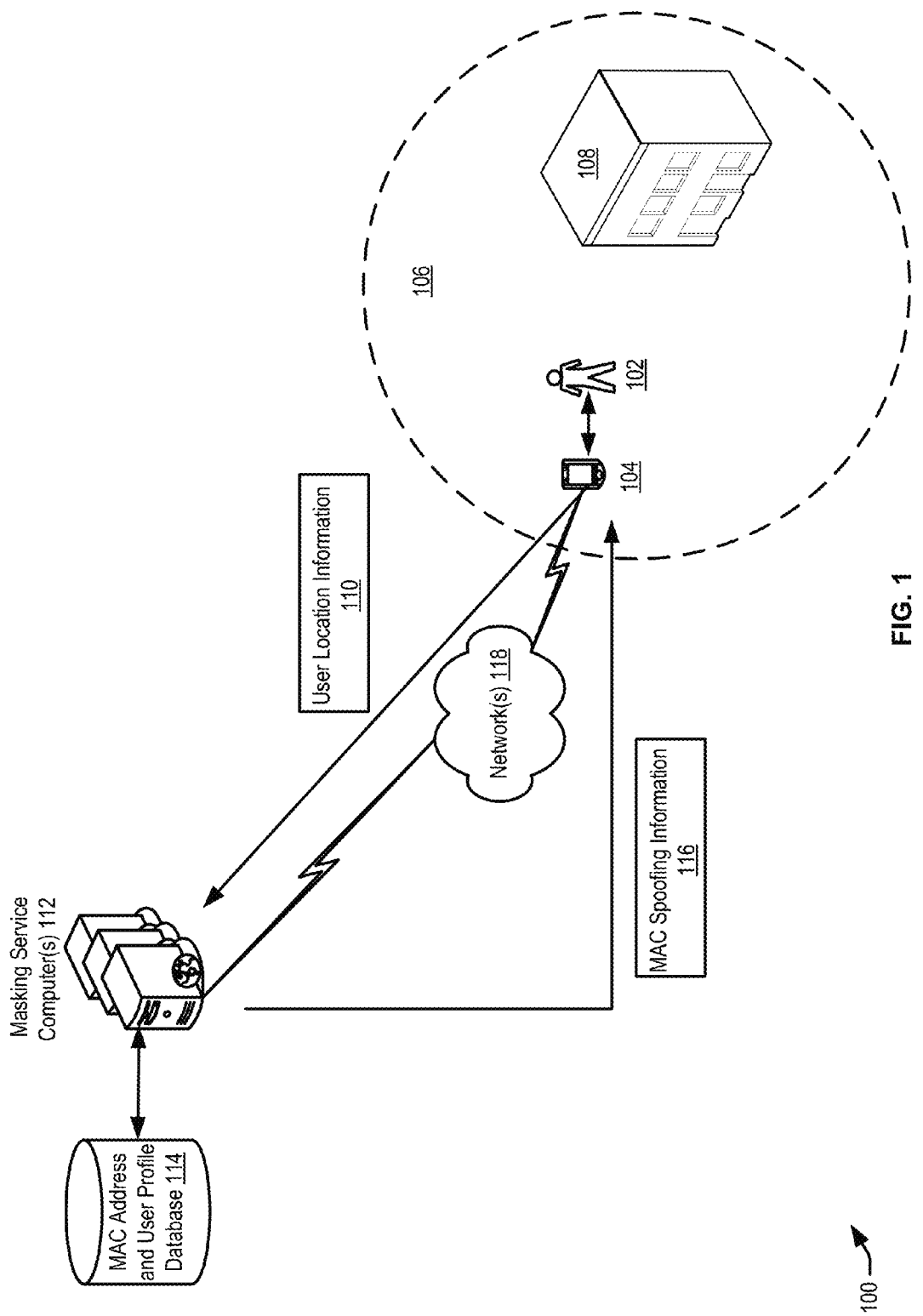
FIG. 1 illustrates an example data flow for an information masking service, according to embodiments.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments of the present disclosure are directed to, among other things, providing an information masking service for protecting the privacy of user information while browsing, shopping, and/or visiting public locations and/or businesses. In some examples, the information masking service may maintain one or more masking profiles that each represent behaviors typically associated with a user that self identifies with a particular user segment. For example, a particular masking profile may be maintained for users that self-identify as a sports fan or video game player. Examples of information included in the masking profiles includes at least information that indicates typical shopping and/or browsing behavior, internet search history, and/or geographical locations within a location that correspond to physical browsing history. In embodiments, the information masking service may generate and maintain masking information, such as MAC addresses or masking identifiers for use in MAC spoofing, that are associated with a masking profile. The information masking service may maintain and update the associations between the masking information and masking profiles in a database, a look up table, or other suitable data format for maintaining associations between information. In accordance with at least one embodiment, in response to a trigger, such as the user and user device entering within a particular range of a retailer, the information masking service may provide masking information for use by the user device to protect the privacy of the corresponding user from data capturing or data monitoring by the retailer. What is needed is a service that allows users to protect their privacy (e.g., their actions) when shopping at retailers or selecting which if any information to share.

In accordance with at least one embodiment, the information masking service may maintain global positioning system (GPS) information for a plurality of locations for use in forming one or more geo-fences to associate with each location. In some examples, user devices are configured to provide GPS information about the user's location and can serve as the trigger for providing and utilizing the masking information upon the user entering one of the maintained geo-fences. In accordance with at least one embodiment, the information masking service may maintain information payloads that can be provided, via computing devices utilizing particular masking information, to a computer system associated with a retailer as part of training the computer system to associate the particular masking information with particular masking profiles. For example, each information payload may include information that is typically associated with users of a particular masking profile (e.g., shopping and/or browsing history, internet search history, or location information).

In embodiments, a retailer or particular location may opt-in or participate in the information masking service by providing access to obtained or captured data and suitable user segments or identifications that the retailer or particular location maintains for users that browse, shop, or visit at said locations. The information masking service may utilize the data provided by the retailers or particular locations to update the behaviors associated with the maintained masking profiles. Thereafter, a user may select a self-identifying user segment, via a masking profile, and be provided with masking information for use by their user device to mask or spoof their identify. Thus, data obtained or captured by the retailer or particular location may be associated with the masked or spoofed identifier rather than the user's particular identity. Further, at locations that opt-in to the information masking service may utilize masking profiles associated with the masked information to generate and provide one or more offers, coupons, or advertisements targeted as users that self-identify to an identity associated with the masking profile that corresponds to the masked information. In accordance with at least one embodiment, the information masking service may maintain a masking profile and masking information association for use by a user that wants complete privacy or anonymity while shopping or visiting a particular location. For example, a masking profile and masking information may be mapped to random user behavior that does not correspond to a particular user segment or self-identifying user group. The information masking service may maintain one or more masking profiles that are semi-anonymous and thus provide information that is normally associated with the user segment that corresponds to the masking profile but not necessarily the particular information of the user themselves.

In a non-limiting example, a user may utilize an application configured to run on their mobile phone to select a masking profile that is provided and maintained by the information masking service before entering a grocery store. The masking profile may correspond to a "soccer mom" profile and thus include information that indicates typical shopping, browsing, or location information for users that self-identify as a "soccer mom." Thereafter, without the user's knowledge, the information masking service may provide a MAC address to the user's mobile phone to spoof the MAC address identifier obtained by any suitable entity attempting to capture information about the user as they enter and shop in the grocery store. The information masking service may provide the spoofing MAC address to the mobile phone based at least in part on receiving GPS information about the user's location and maintained geo-fence information for the grocery store. As the user shops and browses items in the grocery store, information or user behavior attributed to the user may instead be attributed to the masking profile that corresponds to the provided spoofing MAC address. In accordance with at least one embodiment, if the grocery store has opted-in to the information masking service, offers, coupons, or advertisements may be provided to the user's mobile phone that are targeted to the "soccer mom" masking profile which the user may utilize.

FIG. 1 illustrates an example data flow for an information masking service, according to embodiments. The data flow 100 of FIG. 1 includes a user 102 with a user device (computing device) 104 being located within a geo-fence 106 associated with a retailer 108. A "geo-fence" may refer to a virtual perimeter that corresponds to a real-world geographic region. In embodiments, geo-fences may be generated and maintained by the information masking service by utilizing GPS information for particular locations and retailers. Locations that opt-in to the information masking service can also provide geo-fence information that can be utilized by the information masking service to form geo-fences that correspond to the range of networks utilized by each location. Any suitable geo-fencing technique may be utilized. Such techniques are well known to those of skill in the art and, accordingly, are not described in detail herein. In accordance with at least one embodiment, the user device 104 may be configured to provide user location information 110 to the masking service computers 112.

The masking service computers 112 may implement features for the information masking service. FIG. 1 illustrates the masking service computers 112 in communication with a MAC address and masking profile database 114. In accordance with at least one embodiment, the masking service computers 112 may maintain a plurality of masking profiles that are associated with one or more MAC addresses for MAC spoofing of user devices to ensure a user's privacy. As described herein, each masking profile can include information that indicates typical shopping and/or user behavior associated with a plurality of users that self-identify as a particular group (e.g., soccer mom, sports fan, video game player). The masking service computers 112 may map and maintain a number of associations between the MAC addresses and masking profiles for use in the information masking service features described herein. For example, a particular MAC address that is associated with a soccer mom masking profile may be provided to a user device (104) for use in spoofing a data capturing entity (such as retailer 108). In accordance with at least one embodiment, if the retailer 108 has opted-in to the information masking service, the provided MAC address that corresponds to a particular masking profile may be known by the retailer 108. In some embodiments, the behavior of user 102 at retailer 108 may be associated with the provided MAC address as opposed to the actual MAC address of the user device 104 thereby allowing the user 102 to remain semi-anonymous.

In accordance with at least one embodiment, the masking service computers 112 may select an appropriate MAC address to provide 116 to the user device 104 for use in spoofing the retailer 108. In embodiments, the user location information 110 and the MAC spoofing information 116 can be provided to and received from the user device 104 via one or more available networks 118. Available networks include wireless networks, wired networks, cellular networks, Bluetooth networks, or other suitable networks for providing information between computer devices. The user device 104 may be configured to utilize the selected and provisioned MAC address when communicating with networks associated with retailer 108 or any other suitable listening entity that is attempting to capture data bout the user 102 as the user 102 shops, browses, or visits the particular location that corresponds to the retailer 108. A listening entity that is attempting to capture information about the user 102 including their shopping preferences, their browsing preferences, or location preferences may associate the behavior of the user 102 with the MAC address 116 provided by the masking service computers 112 rather than the default MAC address of the user device 104 ensuring that the user 102 maintains anonymity.

FIG. 2 illustrates several examples of masking profile examples that may be maintained by an information masking service, according to embodiments. FIG. 2 includes three exemplary masking profiles 200, 202, and 204 that may be maintained by the information masking service. It should be noted that although one or more pre-defined masking profiles may be maintained and generated by the information masking service, users may define or generate new masking profiles for use in the information masking service. Example masking profile 200 may be maintained for users that identify as "soccer mom" and include information such as websites typically visited 206-210 and shopping history 212-216 including items that are typically purchased by users that self-identify as a "soccer mom." In accordance with at least one embodiment, the information included in an example masking profile (200, 202, and 204) may be obtained or captured by the information masking service from a plurality of users that utilize the information masking service.

Thus, the information included in each masking profile may be dynamically updated with behavior that is most popular among all users that self-identify with a particular user segment. In accordance with at least one embodiment, the information masking service can provide a default data set or information payload for use in generating one or more masking profiles that can be dynamically updated with actual user data as users select particular masking profiles and provide their own behavior information. The example masking profiles 200, 202, and 204 include items historically purchased (shopping history 212-216) by users that self-identify as the "soccer mom," "sports fan," or "video game player." Although the example masking profiles 200-204 include shopping history for items typically found in a retail environment, the shopping history behavior of masking profiles maintained by the information masking service can include items and/or services associated with particular locations and/or retailers including libraries, concert halls, stadiums, theatres, parking lots, or museums.

Figure 3:
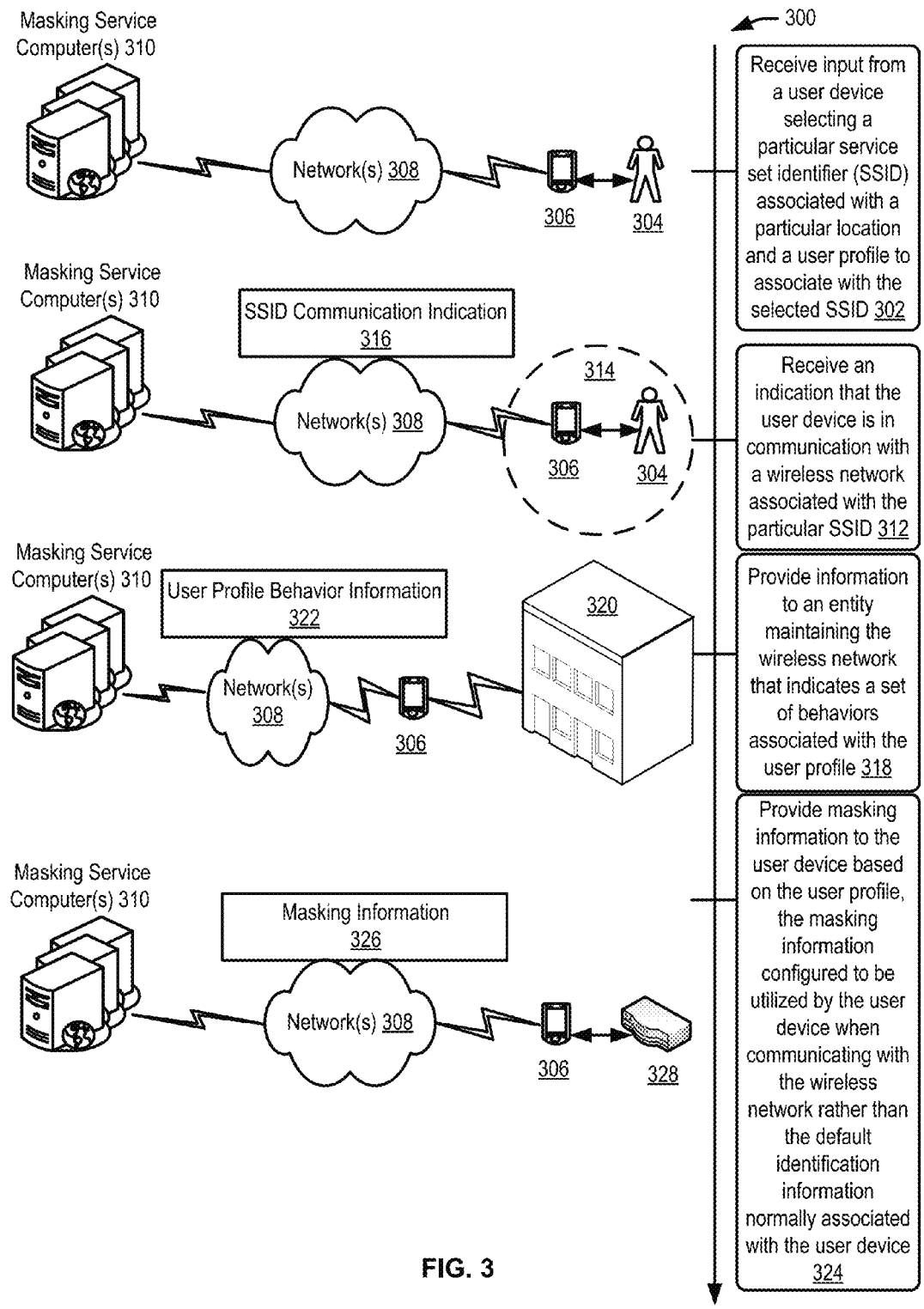
FIG. 3 illustrates an example data flow for an information masking service, according to embodiments.

FIG. 3 illustrates an example data flow for an information masking service, according to embodiments. The example data flow 300 illustrated in FIG. 3 includes one or more operations. However, the order in which the operations are described is not intended to be construed as a limitation, and any number of the described operations can be combined in any order and/or in parallel to implement the described flow. The flow 300 may include receiving input from a user device (e.g., a computing device) selecting a particular service set identifier (SSID) associated with a particular location and a masking profile to associate with the selected SSID at 302. In accordance with at least one embodiment, a user 304 may interact with a user device 306 to select one an SSID for a particular location, such as an SSID for networks provided by a local retail coffee shop. The input selecting the particular SSID can be provided by the user device 306 over one or more available networks 308 to the masking service computers 310 that implement the information masking service.

In accordance with at least one embodiment, the data flow 300 may include receiving an indication that the user device is in communication with a wireless network associated with the particular SSID at 312. In accordance with at least one embodiment, the user 304 interacting with the user device 306 within a wireless network 314 may provide the SSID communication indication 316 to the masking service computers 310 via the networks 308. For example, the user device 306 may ping or beacon for available wireless networks and provide responses (including SSIDs of available wireless networks) to the masking service computers 310. The data flow 300 may include providing information to an entity maintaining the wireless network that indicates a set of behaviors associated with the masking profile at 318. In accordance with at least one embodiment, the masking service computers 310 may maintain a masking profile payload that includes information intended to train an entity attempting to capture information 320 about the user 304 while the user is located near a particular location via the wireless network 314.

The masking profile payload may include masking profile behavior information 322 that indicates behavior that is historically observed for a plurality of users that self-identify with a particular user segment such as "sports fan." The masking profile behavior information 322 may be sent directly to the data capturing entity 320 or via the user device 306 via the one or more available networks 308. The masking service computers 310 may provide the masking profile behavior information 320 utilizing masking information that is associated with a particular masking profile so that the data capturing entity 320 associates the behavior with the masking information thus giving the user 304 some level of anonymity. The data flow 300 may conclude at 324 by providing masking information to the user device based on the masking profile that is configured to be utilized by the user device when communicating with the wireless network rather than the default identification information normally associated with the user device. For example, the masking service computers 310 may provide the masking information 326, via networks 308, to the user device 306 for communicating with a router 328 associated with the data capturing entity 320 and providing the wireless network 314 that corresponds to the particular SSID.

In the illustrated example of FIG. 3, the masking information may include an MAC address for MAC spoofing the user device 306. However, masking information may include any suitable substitute network address and/or identifier such as Bluetooth identifier address information for spoofing Bluetooth networks, international mobile equipment identify (IMEI) spoofing or cloning information, code division multiple access (CMDA) spoofing information, or global system for mobiles (GSM) spoofing information as appropriate given available networks and the type of user device 306. Thereafter, actions, purchases, or other suitable user behavior of the user 304 with user device 306 within a location that corresponds to the wireless network 314 and data capturing entity 320 may be associated with the plurality of users associated with the masking information rather than the personal behaviors of user 304. In accordance with at least one embodiment, the masking information 326 and associated masking profile may correspond to random behaviors of a plurality of users or user segment thus confusing and obfuscating a listening/data capturing entity 320 from being able to attribute private behavior actions of a user to a particular device identification.

Figure 4:
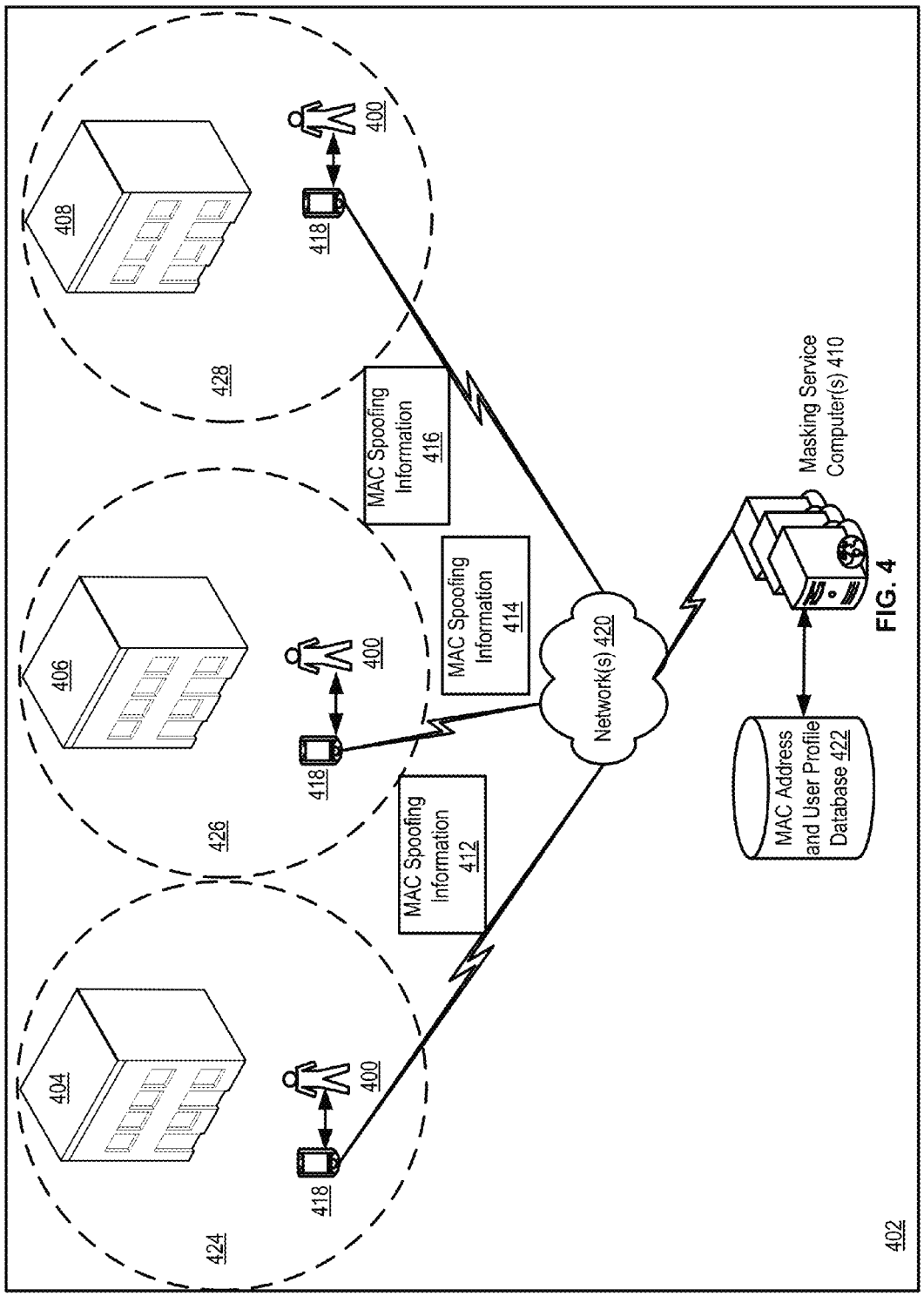
FIG. 4 illustrates an example data flow for an information masking service, according to embodiments.

FIG. 4 illustrates an example data flow for an information masking service, according to embodiments. The example data flow of FIG. 4 includes a user 400 traveling through a shopping mall 402 that includes multiple retailers 404-408. As the user 400 moves from one location to another location within the shopping mall 402, the masking service computers 410 may provide masking information, such as MAC spoofing information 412-416 to a user device 418 that the user 400 is utilizing for ensuring the privacy of the user 400 as they shop or browse. In accordance with at least one embodiment, the masking service computers 410 may provide the MAC spoofing information 412-416 to the user devices 418 via one or more available networks 420. The masking service computers 410 may maintain a plurality of MAC addresses, masking profiles, and associations between the MAC addresses and masking profiles in a database 422 that may be dynamically updated based on input from an aggregate of users or based on selections and user information associated with a particular user such as user 400.

FIG. 4 illustrates several examples of features available with the information masking service. For example, the circled area 424 around retailer 404 may represent a geo-fence that is maintained by the masking service computers 410 for that particular location. The user device 418 may be configured to provide location information, such as GPS information, that the masking service computer 410 can utilize to determine the location of the user 400 and whether they are within the geo-fence 424. The user 400 may have selected a particular masking profile for use at retailer 404 that is triggered by the geo-fence 424 at some previous time. In accordance with at least one embodiment, the masking service computers 410 may select a masking profile on behalf of the user indicating a level of anonymity (semi or complete). The masking service computers 410 may provide the appropriate MAC spoofing information 412 to the user device 418 for use at retailer 404 as the user shops, browses, or visits within an area that corresponds to the geo-fence 424 of retailer 404. In accordance with at least one embodiment, the user may move to a different location within the shopping mall 402 such as retailer 406. In accordance with at least one embodiment, the user 400 may have selected one or more SSIDs associated with particular locations that should be associated with particular masking profiles. For example, the user 400 may have indicated that they would like to be associated with a "video game player" masking profile for SSIDs associated with retailer 406.

FIG. 4 illustrates the user 400 and user device 418 interacting with a wireless network 426 that is associated with the SSID provided by the user discussed above. In accordance with at least one embodiment, the user device 418 may provide information to the masking service computers 410 that indicates that the user device 418 is interacting with, was pinged by, or provided a beacon to the SSID of the wireless network 426. In response to receiving the information about the previously selected SSID from user device 418, the masking service computers 410 may identify the appropriate MAC spoofing information 414 to provide to the user device 418 based at least in part on the masking profile that is associated with the selection of the SSID. For example, at some previous time point the user 400 may have selected a masking profile of "soccer mom" to associate with wireless networks (426) with the selected SSID. The masking service computers 410 may utilize the association of the masking profile with the MAC address to identify the appropriate MAC address and provide it (414) to the user device 418. Thereafter, while the user 400 and user device interact with or are in range of the wireless network 426 and SSID, the device 418 would provide a MAC address indicated by the MAC spoofing information 414 rather than default identification information of the user device 418.

FIG. 4 illustrates the user 400 entering within a geo-fence 428 for a retailer 408 that has opted-in to the information masking service implemented by masking service computers 410. For example, the retailer 408 may have provided to the masking service computers 410 a retailer identification, geographic information for generating the geo-fence 428, and one or more masking profiles including data captured or sought after by the retailer 408. In response to a retailer or location opting-in to the information masking service, the user 400 may select a masking profile for one or more retailers that opt-in to the information masking service and be provided MAC address information for utilizing at said retailers. For example, the user device 418 may provide location information that the masking service computers 410 can utilize to determine that the user 400 is within the geo-fence 428 maintained for retailer 408. In response to determining the location of the user 400 and retailer 408, the masking service computers 410 may generate and provide MAC spoofing information 416 that corresponds to the masking profile selected by the user 400 for the opted-in retailer 408. In accordance with at least one embodiment, the retailer 408 may provide one or more offers, coupons, or advertisements to the user device 418 that are intended for a user that identifies as part of a group represented by the selected masking profile. For example, the retailer 408 may provide an offer for a five percent discount on all products good for the next 30 minutes based on being provided MAC address information that corresponds to a masking profile that is shared between the masking service computers 410 and the retailer 408.

Figure 5:
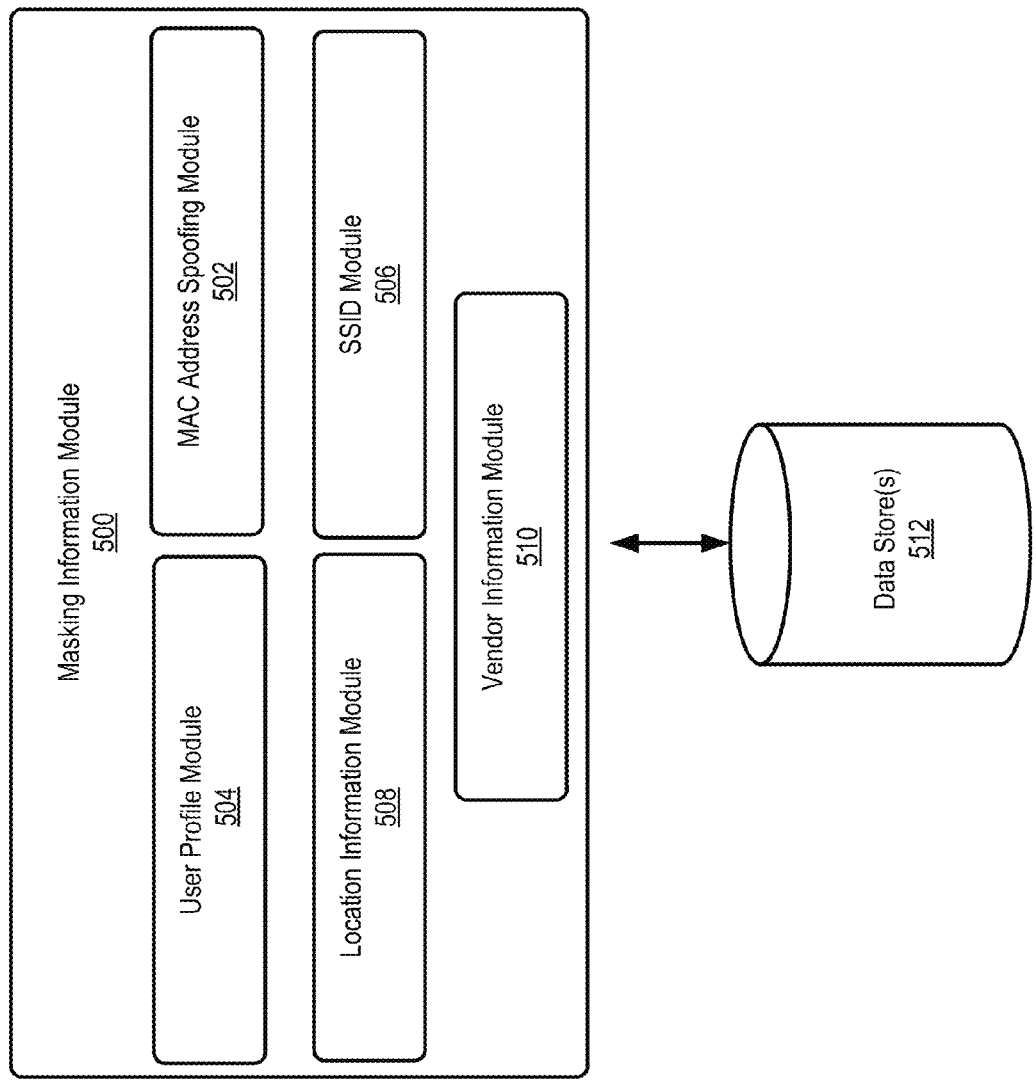
FIG. 5 illustrates an example masking information module, according to embodiments.

FIG. 5 illustrates an example masking information module, according to embodiments. In accordance with at least one embodiment, the masking information module 500 may include a MAC address spoofing module 502, a masking profile module 504, an SSID module 506, a location information module 508, and a vendor information module 510 in communication with a data store 512. The modules included within and including the masking information module 500 may be software modules, hardware modules or a suitable combination thereof. If the modules are software modules, the modules can be embodied on a non-transitory computer readable medium and processed by a processor in any of the computer systems described herein. It should be noted that the described processes and architectures described herein can be performed either in real-time or in an asynchronous mode prior to user interaction. The modules may be configured in the manner suggest in FIG. 5 or may exist as separate modules.

In accordance with at least one embodiment, the masking information module 500 may be configured to maintain masking information for use by user devices (computing devices) for masquerading as another entity, user group, or user segment that corresponds to a masking profile as described herein. In embodiments, the masking information module 500 may be configured to maintain and update the associations between masking information and masking profiles including MAC addresses and particular masking profiles. A masking profile may share an association with a unique masking information in a one to one relationship or a one to many relationship (masking profile to a plurality of masking information). In accordance with at least one embodiment, the masking information module 500 may be configured to maintain selections by users for different anonymity modes including no anonymity (no provision of masking information necessary), semi-anonymity (provide masking information that corresponds to a particular masking profile as described herein), or complete anonymity (provide a series of masking information that corresponds to a random masking profile to obfuscate the gathering of data about the user). In accordance with at least one embodiment, the masking information module 500 may be configured to provide a series of different masking information at certain time intervals to enable semi-anonymity or complete anonymity. The time intervals may be specified by an administrator associated with the information masking service or by the users themselves interacting with a user preferences user interface provided by the information masking service.

In accordance with at least one embodiment, the MAC address spoofing module 502 may be configured to maintain a plurality of MAC addresses for use in spoofing data capturing entities. The MAC addresses may be configured to be utilized by user devices of users for masquerading as a user that self-identifies as a member of a particular user group including no group but random data. In embodiments, the MAC address spoofing module 502 may be configured to generate and provide a notification to user devices before MAC spoofing, or masking information masquerading occurs. In accordance with at least one embodiment, the masking information service may utilize the feedback from the provided notification to begin masking the device identification information for the user device or to allow data to be captured. In embodiments, the notification may be provided to the user device of the user via an email, a notification that is configured to be presented in an application associated with the information masking service, a short message service (SMS) text, or via a network document generated and provided by the information masking service. In accordance with at least one embodiment, the masking profile module 504 may be configured to maintain a plurality of masking profiles. Each masking profile may include information that indicates historical behavior of a plurality of users that self-identify with a user group that is associated with the masking profile (e.g., typical shopping, browsing, web history, or location information of "soccer mom" users).

In embodiments, the masking profile module 504 may be configured to enable users to define new masking profiles that they wish to be associated with. Thereafter, the user can provide their own data that corresponds to behaviors of the newly generated masking profile group by either: selecting from user data maintained by the information masking service; or by allowing the masking profile module 504 to capture any suitable behavioral data the user provides while utilizing the newly generated masking profile at particular locations and/or retailers. In accordance with at least one embodiment, the masking profile module 504 may be configured maintain, update, and provide masking profile payload information that is configured to train data capturing entities such as retailers or particular locations. For example, the masking profile payload information may be maintained in a particular data object provided by the masking profile module 504 and utilized by machine learning algorithms employed by data capturing entities as appropriate in machine learning technology. In accordance with at least one embodiment, the masking profile module 504 may be configured to generate and provide a user interface (UI) that is further configured to be presented in an application or network document to a user for specifying or selecting masking profiles. The UI provided to the user for presentation may be enabled to allow the user to specify user preferences (how they wish to receive notifications or offers from retailers), selections of masking profiles for particular locations, selections of particular SSIDs and associated masking profiles for use with the SSIDs, and selections of privacy modes for use by the information masking service.

In accordance with at least one embodiment, the SSID module 506 may be configured to maintain and update the selection of particular SSIDs that the user wishes to specify masking profiles for utilizing when interacting with said SSIDs. In embodiments, the SSID module 506 may be configured to determine when a user device of a user is interacting with a particular SSID and provide the appropriate masking profile and masking information. The determination performed by the SSID module 506 may be based at least in part on SSID information provided by networks interacting with a user device or other network identification information. In accordance with at least one embodiment, the SSID module 506 may be configured to provide instructions to lower or raise the power given to an antenna associated with a user device based on the SSID information. The lowering or raising of the power given to an antenna or other components of a user device can, in embodiments, result in particular networks associated with the SSIDs from capturing information about the user device or behaviors associated with the user device.

In accordance with at least one embodiment, the location information module 508 may be configured to maintain geographic location information for retailers or particular locations. The geographic location information may be provided by the retailers or particular locations in some embodiments. The location information module 508 may be configured to maintain and update information that indicates geo-fences for the retailers or particular locations for determining when to provide masking information and masking profile information as described herein. In accordance with at least one embodiment, the location information module 508 may be configured to determine the users location utilizing geographical position information from a user device and determining if a user device/user has triggered the maintained geo-fences associated with retailers or particular locations. The location information module 508 may be configured to provide instructions to a user device to obtain location data of a user/user device based on pinging operations performed by the user device turning on and off at given intervals while the user browses, shops, or visits particular locations. The location data may be included in masking profiles and utilized to update the masking profile information for particular user segments.

In accordance with at least one embodiment, the vendor information module 510 may be configured to maintain information from vendors, retailers, or particular locations that opt-in or participate in the information masking service. The vendor information module 510 may maintain and update masking profiles generated and maintained by the vendors, retailers, or particular locations and map the provided masking profiles with the masking profiles that are maintained by the information masking service. In accordance with at least one embodiment, the vendor information module 510 may be configured to maintain and provide offers, coupons, or advertisements that are provided by the participating vendors, retailers, or particular locations that are intended for users that self-identify with user segments and corresponding masking profiles. In accordance with at least one embodiment, the vendor information module 510 may be configured to obtain and utilize training data provided by participating entities for use in training other non-participating entities or for updating the historical behaviors indicated by the masking profiles maintained by the information masking service. In accordance with at least one embodiment, the information masking service, via the vendor information module 510, may provide subsets of data in response to queries from computer systems associated with participating entities or non-participating entities including masking profile information or user preferences regarding notifications, offers, and advertisements.

Figure 6:
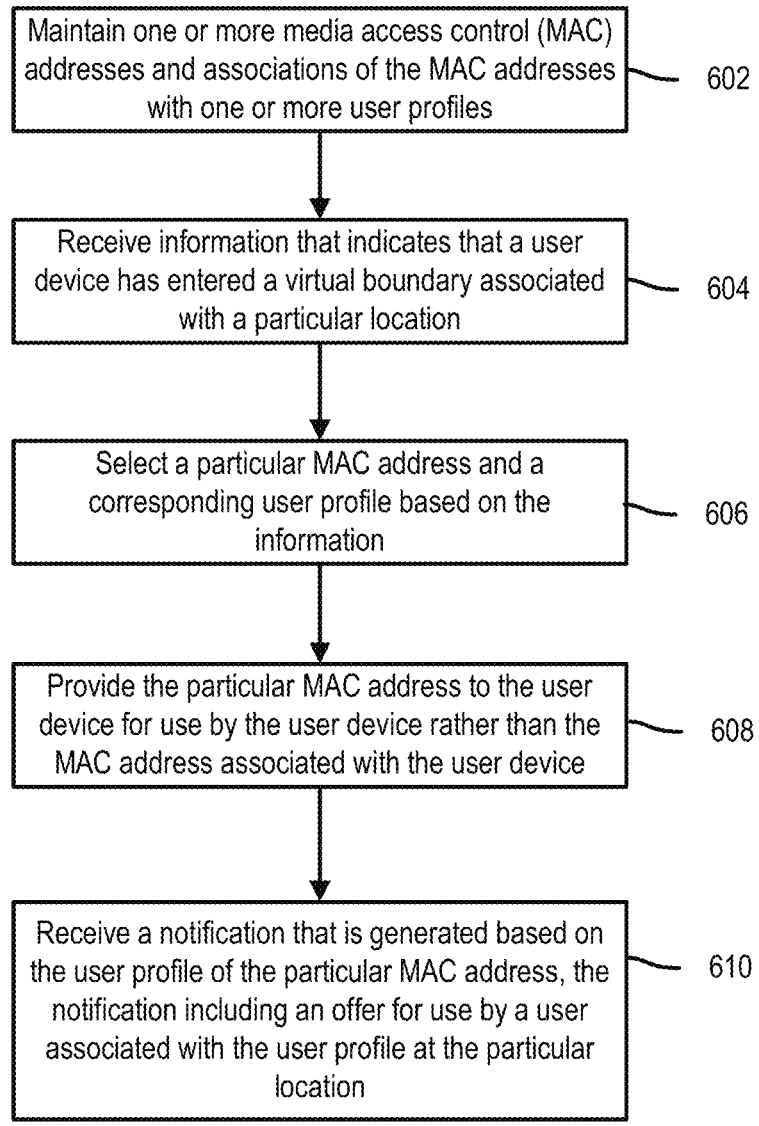
FIG. 6 illustrates an example flow diagram for an information masking service, according to embodiments.
Figure 7:
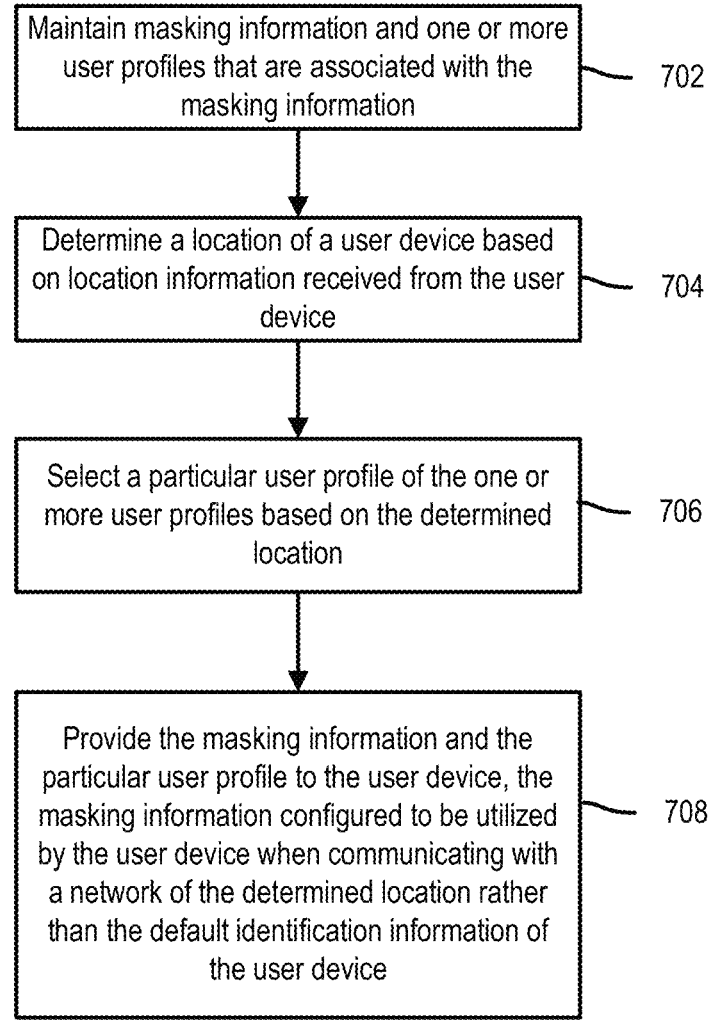
FIG. 7 illustrates an example flow diagram for an information masking service, according to embodiments.

FIGS. 6 and 7 illustrate example flow diagrams for an information masking service, according to embodiments. These processes are illustrated as a logical flow diagram, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer executable instructions include routines, programs, objects, components, data structures, and the like that perform particular functions or implement particular data types. The order in which the operations are described is not intended to be construed as a limitation, and any suitable number of the described operations can be combined in any suitable order and/or in parallel to implement the processes.

Additionally, some, any, or all of the process (or any other suitable processes described herein, or variations and/or combinations thereof) may be performed under the control of one or more computer systems configured with executable instructions and may be implemented as code (e.g., executable instructions, one or more computer programs, or one or more applications) executing collectively on one or more processors, by hardware or combinations thereof. As noted below, the code may be stored on a computer-readable storage medium, for example, in the form of a computer program including a plurality of instructions executable by one or more processors. The computer-readable storage medium may be non-transitory.

In some examples, one or more masking service computers (e.g., utilizing at least one of a masking information module 500, a MAC address spoofing module 502, a masking profile module 504, an SSID module 506, a location information module 508, and a vendor information module 510 in communication with one or more data stores 512) shown in FIG. 5 may perform the processes 600 and 700 of FIGS. 6 and 7. In FIG. 6, the process 600 may include maintaining one or more media access control (MAC) addresses and associations of the MAC addresses with one or more masking profiles at 602. In embodiments, each masking profile may include information that indicates typical behavior of a user that self-identifies as a particular user segment represented by the masking profile. Examples of typical behavior include shopping or browsing behavior at a particular location or internet search history. The process 600 may include receiving information that indicates that a user device has entered a virtual boundary associated with a particular location at 604.

In embodiments, the process 600 may include selecting a particular MAC address and a corresponding masking profile based at least in part on the information at 606. In accordance with at least one embodiment, the information may include GPS signals provided by the user device to the information masking service. In accordance with at least one embodiment, the information may include a user provided signal, such as a selection of a particular anonymity mode (semi or complete). The process 600 may include providing the particular MAC address to the user device for use by the user device rather than the MAC address associated with the user device at 608. For example, the user device may be configured to utilize the provided particular MAC address to spoof listening entities that are attempting to obtain information about a user associated with the user device. By utilizing the provided MAC address, obtained information may be associated to the spoofed MAC address as opposed to the actual MAC address of the user device in the user's possession. The process 600 may conclude at 610 by receiving a notification that is generated based on the masking profile of the particular MAC address where the notification includes an offer for use by a user associated with the masking profile at the particular location. For example, the user device may utilize a MAC address that corresponds to a "sports fan" user segment. Thereafter, as the user visits a particular location, the particular location may provide an offer or coupon for use by the user that is self-identifying as a "sports fan" by selecting the particular masking profile.

In accordance with at least one embodiment, the process 700 of FIG. 7 may include maintaining masking information and one or more masking profiles that are associated with the masking information at 702. In embodiments, the masking information can include MAC addresses for use in MAC spoofing devices, Bluetooth identifier addresses for spoofing Bluetooth networks, international mobile equipment identify (IMEI) spoofing or cloning information, code division multiple access (CMDA) spoofing information, global system for mobiles (GSM) spoofing information. In accordance with at least one embodiment, the process 700 may include determining a location of a user device based on location information received from the user device at 704. As described herein, the location information may include GPS information provided by the user device and/or input from a user utilizing the user device that indicates a location that the user is about to enter or a location of where they are currently located.

In accordance with at least one embodiment, the process 700 may include selecting a particular masking profile of the one or more masking profiles based on the determined location at 706. In embodiments, the information masking service may utilize input provided by a user before entering the determined location to select the particular masking profile. The masking information service may utilize user preferences based on selections made historically by the user in selecting the masking profile for use at a particular location. The process 700 may conclude at 708 by providing the masking information and the particular masking profile to the user device, the masking information configured to be utilized by the user device when communicating with a network of the determined location rather than the default identification information of the user device. In embodiments, the masking profile may include information, such as a masking profile payload, that can be provided to the determined location for aiding in spoofing or protecting the identity of the user. For example, the masking profile payload may indicate purchasing behavior, browsing behavior, typical locations within the determined location that a user can be found in at a given time, or any other suitable information for training a data capturing entity to associate the behavior given to them to the masking information being utilized by the user device. Thereafter, actual behavior by a user utilizing the user device may only add or slightly modify the behavior provided by the masking profile payload for the listening entity.

Figure 8:
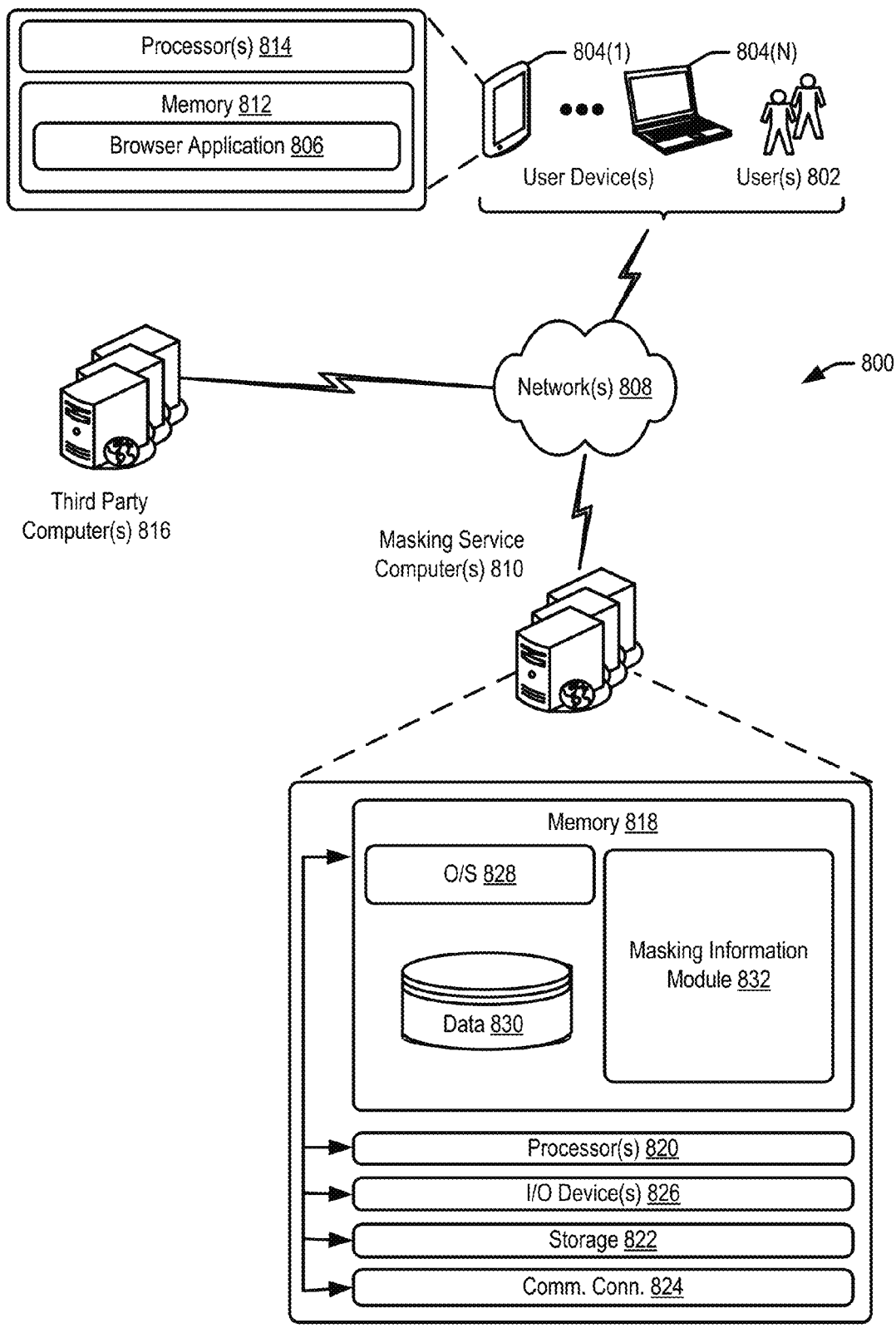
FIG. 8 illustrates an example computer architecture for implementing an information masking service, according to embodiments.

FIG. 8 illustrates an example computer architecture for implementing an information masking service, according to embodiments. In architecture 800, one or more users 802 (e.g., users) may utilize user computing devices 804(1)-(N) (collectively, user devices 804) to access a browser application 806 (e.g., a network document browser) or a user interface (UI) accessible through the browser application 806, via one or more networks 808 to select one or more masking profiles to associate with. The "browser application" 806 can be any suitable browser control or native application that can access and display a web page or other information. In some aspects, the browser application 806 may be utilized to select a masking profile maintained by the information masking service, generate a new masking profile, or to view and access offers provided to a selected masking profile. In embodiments, user preferences (such as notifications before information masking begins, automatic transitions from one masking profile to another, etc.,) may be selected or updated via the browser application 806. In accordance with at least one embodiment, the user 802 may interact with the browser application 806, via user device 804, to select one or more service set identifiers (SSIDs) to associate with a masking profile.

The architecture 800 may also include, one or more masking service computers 810 that may, in some examples, provide computing resources such as, but not limited to, client entities, low latency data storage, durable data storage, data access, management, virtualization, hosted computing environment or "cloud-based" solutions, electronic content performance management, etc. The one or more masking service computers 810 may also be operable to provide site hosting, computer application development, and/or implementation platforms, combinations of the foregoing, or the like to the one or more users 802.

In one illustrative configuration, the user computing devices 804 may include at least one memory 812 and one or more processing units or processor(s) 814. The processor (s) 814 may be implemented as appropriate in hardware, computer-executable instructions, firmware, or combinations thereof. Computer-executable instruction or firmware implementations of the processor(s) 814 may include computer-executable or machine-executable instructions written in any suitable programming language to perform the various functions described herein. The user devices 804 may also include geo-location devices (e.g., a global positioning system (GPS) device or the like) for providing and/or recording geographic location information associated with the user devices 804. The memory 812 may store program instructions that are loadable and executable on the processor(s) 814, as well as data generated during the execution of these programs. Depending on the configuration and type of user device 804, the memory 812 may be volatile (such as random access memory (RAM)) and/or non-volatile (such as read-only memory (ROM), flash memory, etc.). The user device 804 may also include additional removable storage and/or non-removable storage including, but not limited to, magnetic storage, optical disks, and/or tape storage. The disk drives and their associated non-transitory computer-readable media may provide non-volatile storage of computer-readable instructions, data structures, program modules, and other data for the computing devices. In some implementations, the memory 812 may include multiple different types of memory, such as static random access memory (SRAM), dynamic random access memory (DRAM), or ROM.

Turning to the components of the memory 812 in more detail, the memory 812 may include an operating system and one or more application programs or services for implementing the features disclosed herein including providing location information, receiving and utilizing masking information, and displaying offers, coupons, or advertisements from retailers or particular locations. Additionally, the memory 812 may store access credentials and/or other user information such as, but not limited to, user IDs, passwords, and/or other user information. In some examples, the user information may include information for authenticating an account such as, but not limited to, a device ID, a cookie, an IP address, a location, or the like. In addition, the user information may include a user 802 provided response to a security question or a geographic location obtained by the user device 804.

In some examples, the networks 808 may include any one or a combination of many different types of networks, such as cable networks, the Internet, wireless networks, cellular networks and other private and/or public networks. While the illustrated example represents the users 802 communicating with masking service computers 810 over the networks 808, the described techniques may equally apply in instances where the users 802 interact with the one or more masking service computers 810 via the one or more user devices 804 over a landline phone, via a kiosk, or in any other manner. It is also noted that the described techniques may apply in other client/server arrangements (e.g., set-top boxes, etc.), as well as in non-client/server arrangements (e.g., locally stored applications, peer-to-peer arrangements, etc.).

The browser application 806 may be capable of handling requests from many users 802 and serving, in response, various user interfaces that can be rendered at the user devices 804 such as, but not limited to, a network site or web page. The browser application 806 can interact with any type of network site that supports user interaction, including social networking sites, electronic retailers, informational sites, blog sites, search engine sites, news and entertainment sites, electronic marketplaces, and so forth. The described techniques can similarly be implemented outside of the browser application 806, such as with other applications running on the user device 804. In some examples, the one or more masking service computers 810 may communicate with one or more third party computers 816 to provide masking profile information, masking information, or location information as described herein.

The one or more masking service computers 810 may be any type of computing device such as, but not limited to, a mobile phone, a smart phone, a personal digital assistant (PDA), a laptop computer, a desktop computer, a server computer, a thin-client device, a tablet PC, etc. Additionally, it should be noted that in some embodiments, the one or more masking service computers 810 may be executed by one or more virtual machines implemented in a hosted computing environment. The hosted computing environment may include one or more rapidly provisioned and released computing resources, which computing resources may include computing, networking, and/or storage devices. A hosted computing environment may also be referred to as a cloud computing environment or distributed computing environment. In some examples, the one or more masking service computers 810 may be in communication with the user device 804 via the networks 808, or via other network connections. The one or more masking service computers 810 may include one or more servers, perhaps arranged in a cluster or as individual servers not associated with one another.

In one illustrative configuration, the one or more masking service computers 810 may include at least one memory 818 and one or more processing units or processors(s) 820. The processor(s) 820 may be implemented as appropriate in hardware, computer-executable instructions, firmware, or combinations thereof. Computer-executable instruction or firmware implementations of the processor(s) 820 may include computer-executable or machine-executable instructions written in any suitable programming language to perform the various functions described when executed by a hardware computing device, such as a processor. The memory 818 may store program instructions that are loadable and executable on the processor(s) 820, as well as data generated during the execution of these programs. Depending on the configuration and type of the one or more masking service computers 810, the memory 818 may be volatile (such as RAM) and/or non-volatile (such as ROM, flash memory, etc.). The one or more masking service computers 810 or servers may also include additional storage 822, which may include removable storage and/or non-removable storage. The additional storage 822 may include, but is not limited to, magnetic storage, optical disks and/or tape storage. The disk drives and their associated computer-readable media may provide non-volatile storage of computer-readable instructions, data structures, program modules, and other data for the computing devices. In some implementations, the memory 818 may include multiple different types of memory, such as SRAM, DRAM, or ROM.

The memory 818, the additional storage 822, both removable and non-removable, are all examples of non-transitory computer-readable storage media. For example, computer-readable storage media may include volatile or non-volatile, removable or non-removable media implemented in any method or technology for storage of information such as computer-readable instructions, data structures, program modules, or other data. The memory 818 and the additional storage 822 are all examples of non-transitory computer storage media. Additional types of non-transitory computer storage media that may be present in the one or more masking service computers 810 may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, or any other medium which can be used to store the desired information and which can be accessed by the one or more masking service computers 810. Combinations of any of the above should also be included within the scope of non-transitory computer-readable media.

The one or more masking service computers 810 may also contain communication connection interface(s) 824 that allow the one or more masking service computers 810 to communicate with a data store, another computing device or server, user terminals and/or other devices on the networks 808. The one or more masking service computers 810 may also include I/O device(s) 826, such as a keyboard, a mouse, a pen, a voice input device, a touch input device, a display, speakers, a printer, etc.

Turning to the contents of the memory 818 in more detail and as was described above in further detail in FIG. 5, the memory 818 may include an operating system 828, one or more data stores 830, and/or one or more application programs or services for implementing the features disclosed herein including a masking information module 832 (which may be an example of masking information module 500). In accordance with at least one embodiment, the masking information module 832 may be configured to maintain one or more masking profiles that indicate typical behavior of a user segment that users may self-identify with, maintain a plurality of masking information that may be provided to a user device for use in protecting the privacy of a user while shopping, visiting, or browsing at a retailer or particular location, maintain an association between the masking information and each masking profile, maintain location information for a plurality of locations, and in response to receiving location information from a user device, provide the masking information to the user device of the user.

Figure 9:
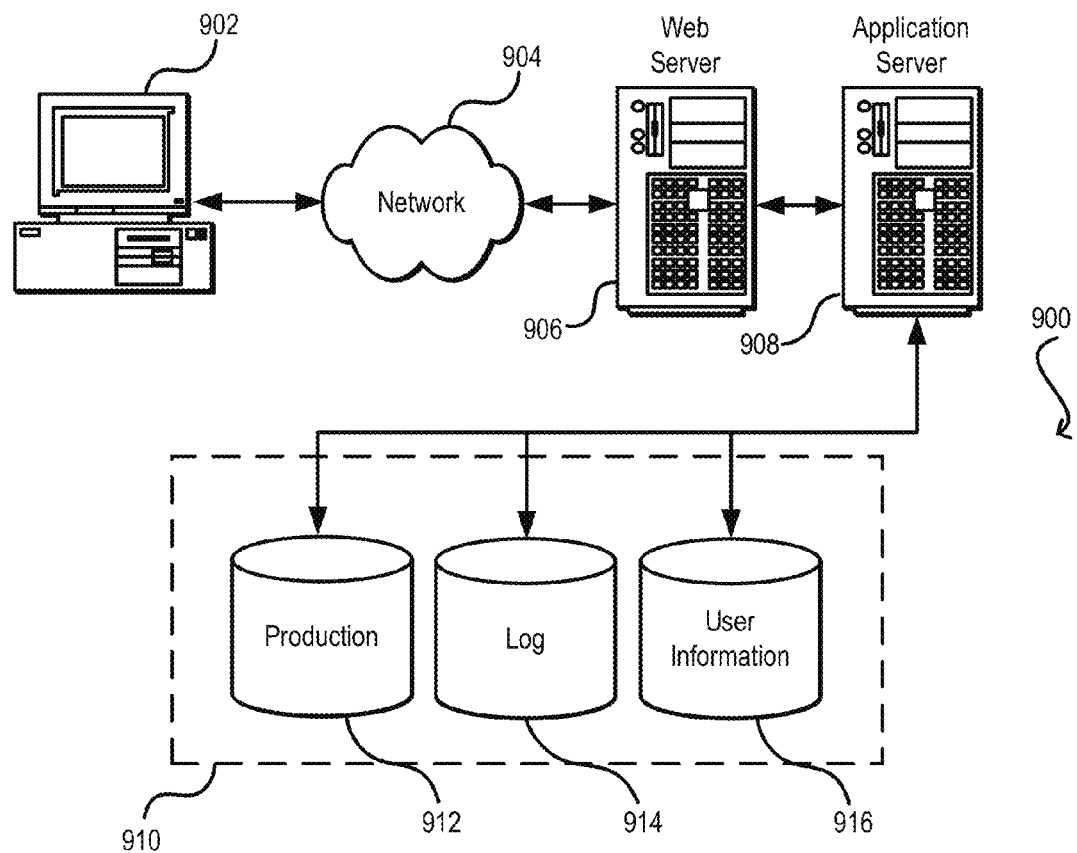
FIG. 9 illustrates an environment in which various embodiments can be implemented.

FIG. 9 illustrates aspects of an example environment 900 for implementing aspects in accordance with various embodiments. As will be appreciated, although a Web-based environment is used for purposes of explanation, different environments may be used, as appropriate, to implement various embodiments. The environment includes an electronic client device 902, which can include any appropriate device operable to send and receive requests, messages, or information over an appropriate network 904 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 906 for receiving requests and serving content in response thereto, although for other networks an alternative device serving a similar purpose could be used as would be apparent to one of ordinary skill in the art.

The illustrative environment includes at least one application server 908 and a data store 910. It should be understood that there can be several application servers, layers, or other elements, processes or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio and/or video to be transferred to the user, which may be served to the user by the Web server in the form of HyperText Markup Language ("HTML"), Extensible Markup Language ("XML") or another appropriate structured language in this example. The handling of all requests and responses, as well as the delivery of content between the client device 902 and the application server 908, can be handled by the Web server. It should be understood that the Web and application servers are not required and are merely example components, as structured code discussed herein can be executed on any appropriate device or host machine as discussed elsewhere herein.

The data store 910 can include several separate data tables, databases or other data storage mechanisms and media for storing data relating to a particular aspect. For example, the data store illustrated includes mechanisms for storing production data 912 and user information 916, which can be used to serve content for the production side. The data store also is shown to include a mechanism for storing log data 914, which can be used for reporting, analysis, or other such purposes. It should be understood that there can be many other aspects that may need to be stored in the data store, such as for page image information and to access right information, which can be stored in any of the above listed mechanisms as appropriate or in additional mechanisms in the data store 910. The data store 910 is operable, through logic associated therewith, to receive instructions from the application server 908 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the user device 902. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 9. Thus, the depiction of the system 900 in FIG. 9 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
   maintaining, by a first computer system, one or more media access control (MAC) addresses and corresponding associations of the MAC addresses with one or more masking profiles, the one or more masking profiles indicating purchasing behavior of a segment of users associated with an electronic marketplace;
   receiving information, from a user device, indicating that the user device has entered a geo-fence associated with a location of a retailer;
   selecting, by the first computer system, a particular MAC address of the one or more MAC addresses and a corresponding masking profile of the one or more masking profiles based at least in part on the information;
   providing, by the first computer system, the particular MAC address, the corresponding masking profile, and training information associated with the corresponding masking profile to the user device, the particular MAC address configured to be utilized by the user device when communicating with a network associated with a second computer system of the location of the retailer rather than a default MAC address associated with the user device, the training information configured to be provided to the second computer system and utilized by a machine learning algorithm implemented by the second computer system of the location; and
   receiving a recommendation that is configured to be provided to the user device, the recommendation generated based at least in part on the masking profile associated with the particular MAC address and including a promotional offer for use by a user associated with the masking profile at the location of the retailer.

2. The computer-implemented method of claim 1, further comprising providing a notification to the user device that enables the user to authorize the provision of the particular MAC address.

3. The computer-implemented method of claim 1, further comprising providing, by the first computer system via the particular MAC address, the training information associated with the corresponding masking profile to a data capturing entity associated with the retailer.

4. The computer-implemented method of claim 1, further comprising receiving, from the user device, input for generating a new masking profile for use at the location of the retailer.

5. The computer-implemented method of claim 1, wherein the recommendation is provided to the user device by at least one of email, short message service (SMS) text, an application notification, or via a network document.

6. A system comprising:
   a processor; and
   a memory including instructions that, when executed by the processor, cause the system to, at least:
   maintain masking information and one or more masking profiles that are associated with the masking information, a masking profile of the one or more masking profiles indicating usage behavior of a user at a particular location;
   determine a location of a user device based at least in part on location information received from a user device;
   select a particular masking profile of the one or more masking profiles based at least in part on the determined location; and
   provide the masking information, the particular masking profile, and training information associated with the particular masking profile to the user device, the masking information configured to be utilized by the user device when communicating with a network of the determined location rather than the default identification information of the user device, the training information configured to be provided to the location utilizing the masking information and by a machine learning algorithm implemented by a computer system of the location.

7. The system of claim 6, wherein the masking information includes at least one of media access control (MAC) address information, Bluetooth identifier addresses information, international mobile equipment identify (IMEI) information, IMEI cloning information, code division multiple access (CMDA) information, or global system for mobiles (GSM) information.

8. The system of claim 6, wherein the instructions when executed by the processor further cause the system to receive input via the user device selecting the particular masking profile for use at the determined location.

9. The system of claim 6, wherein the particular masking profile corresponds to a random user segment that includes historical behavior from one or more user segments.

10. The system of claim 9, wherein different masking information is provided to the user device at certain time intervals in response to a selection of the particular masking profile that corresponds to the random user segment.

11. The system of claim 6, wherein the particular masking profile includes information that indicates historical behavior of one or more users that identify as a particular user segment.

12. A non-transitory computer readable medium storing specific computer-executable instructions that, when executed by a processor, cause a computer system to at least:
receive input from a user device selecting a particular wireless network identifier associated with a particular location and a masking profile to associate with the selected particular wireless network identifier, the masking profile indicating behavior of a user at the particular location and including training information that is configured to be provided to a wireless network associated with the particular wireless network identifier and further configured to be utilized by a machine learning algorithm implemented by a first computer system of an entity associated with the wireless network;
in response to receiving an indication that the user device is in communication with the wireless network associated with the particular wireless network identifier:
provide information to the entity maintaining the wireless network, the information indicating a set of behaviors associated with the masking profile; and
provide masking information to the user device based at least in part on the masking profile, the masking information configured to be utilized by the user device when communicating with the wireless network rather than default identification information associated with the user device.

13. The computer readable medium of claim 12, further comprising receiving, from a second computer system associated with the particular location, masking profile mapping performed by the particular location for associated users.

14. The computer readable medium of claim 13, further comprising updating the masking profile based at least in part on the masking profile mapping performed by the particular location.

15. The computer readable medium of claim 12, further comprising generating geo-fence information for the particular location based at least in part on the indication from the wireless network.

16. The computer readable medium of claim 12, further comprising updating the masking profile based at least in part on information obtained from the user device while utilizing the masking information.

17. The computer readable medium of claim 12, wherein the masking information is configured to be utilized by one or more unique identification channels associated with the user device.

18. The computer readable medium of claim 12, further comprising maintaining a history log of offers provided by the entity maintaining the wireless network intended for users that identify with a user segment that corresponds to the masking profile.

* * * * *